(12) United States Patent
Hyldgaard et al.

(10) Patent No.: US 11,174,089 B2
(45) Date of Patent: Nov. 16, 2021

(54) METHOD FOR MANUFACTURE OF AND A FOIL FOR ENCLOSING OR WRAPPING A PRODUCT TO BE HEATED IN AN OVEN

(71) Applicant: Danapak Flexibles A/S, Slagelse (DK)

(72) Inventors: Lars Wiggers Hyldgaard, Odense Sø (DK); Peter Jørgensen, Solrød Strand (DK); Lars Christian Christensen, Salgelse (DK)

(73) Assignee: Danapak Flexibles A/S, Slagelse (DK)

( * ) Notice: Subject to any disclaimer, the term of this patent is extended or adjusted under 35 U.S.C. 154(b) by 0 days.

(21) Appl. No.: 16/343,169

(22) PCT Filed: Oct. 13, 2017

(86) PCT No.: PCT/EP2017/076217
§ 371 (c)(1),
(2) Date: Apr. 18, 2019

(87) PCT Pub. No.: WO2018/073126
PCT Pub. Date: Apr. 26, 2018

(65) Prior Publication Data
US 2019/0315552 A1 Oct. 17, 2019

(30) Foreign Application Priority Data

Oct. 18, 2016 (EP) ..................................... 16194284

(51) Int. Cl.
*B65D 81/34* (2006.01)
*B05D 7/00* (2006.01)
(Continued)

(52) U.S. Cl.
CPC .......... *B65D 81/343* (2013.01); *A47J 36/027* (2013.01); *B05D 7/52* (2013.01); *H05B 6/6494* (2013.01);
(Continued)

(58) Field of Classification Search
None
See application file for complete search history.

(56) References Cited

U.S. PATENT DOCUMENTS

2002/0127503 A1* 9/2002 Elst .......................... G03C 1/29
430/567
2004/0122167 A1* 6/2004 Kusudou ................... C08F 8/28
525/61
(Continued)

FOREIGN PATENT DOCUMENTS

WO  WO 92/03358 A2   3/1992
WO  WO 2012/160181 A1  11/2012
WO  WO 2014/111403 A1   7/2014

OTHER PUBLICATIONS

Olabisi et al. (Handbook of Thermoplastics, Polyvinyl Butyral, Chapters, Dec. 22, 2015, pp. 89-137. (Year: 2015).*
(Continued)

*Primary Examiner* — Francisco W Tschen
(74) *Attorney, Agent, or Firm* — Holland & Hart LLP

(57) ABSTRACT

A method of manufacturing a foil for enclosing or wrapping a product configured to be heated in an oven includes: providing an aluminium layer, applying a first ink material at a surface of the aluminium layer to form a first ink layer, and applying a second ink material at a surface of the first ink layer to form a second ink layer. The first ink layer is positioned between the aluminium layer and the second ink layer, and is configured to absorb radiant energy. The second ink layer is configured to allow radiant energy to pass through to reach the first ink layer. A binder system of the first ink material or the second ink material is based at least in part on polyvinyl butyral (PVB).

8 Claims, 2 Drawing Sheets

(51) Int. Cl.
　　　*B32B 15/20*　　　(2006.01)
　　　*A47J 36/02*　　　(2006.01)
　　　*H05B 6/64*　　　(2006.01)
　　　*B32B 15/082*　　　(2006.01)

(52) U.S. Cl.
　　　CPC ........ *B05D 2202/25* (2013.01); *B32B 15/082* (2013.01); *B32B 15/20* (2013.01); *B32B 2307/4023* (2013.01); *B32B 2439/70* (2013.01); *B65D 2581/34* (2013.01); *B65D 2581/3494* (2013.01)

(56) References Cited

U.S. PATENT DOCUMENTS

| | | |
|---|---|---|
| 2006/0049190 A1 | 3/2006 | Middleton et al. |
| 2006/0075917 A1* | 4/2006 | Edwards ................ B41J 11/002 101/483 |
| 2010/0200572 A1* | 8/2010 | Schoning ................ C09D 5/32 219/647 |
| 2010/0247876 A1* | 9/2010 | Omino ................ C08G 18/10 428/201 |
| 2018/0021810 A1* | 1/2018 | Takayama ............ B32B 15/088 427/385.5 |

OTHER PUBLICATIONS

Sifang Li; "Preparation of fine chemicals from acetylene"; Nan Qiang Series of Xiamen University [Series 6]; Evidence 1: Aug. 2, 2021; XCH/HLU/AWACO-16417; 9 pgs.

Tiecheng Zhang; "Latest new engineering materials, new production technology and application, development and research of new products and practical encyclopedia of industrial technical standards TB3-51/Z999—Coating and adhesive rolls": Xueyuan Audiovisual Press; Evidence 2: Aug. 3, 2021; XCH/HLU/AWACO-16417; 7 pgs.

* cited by examiner

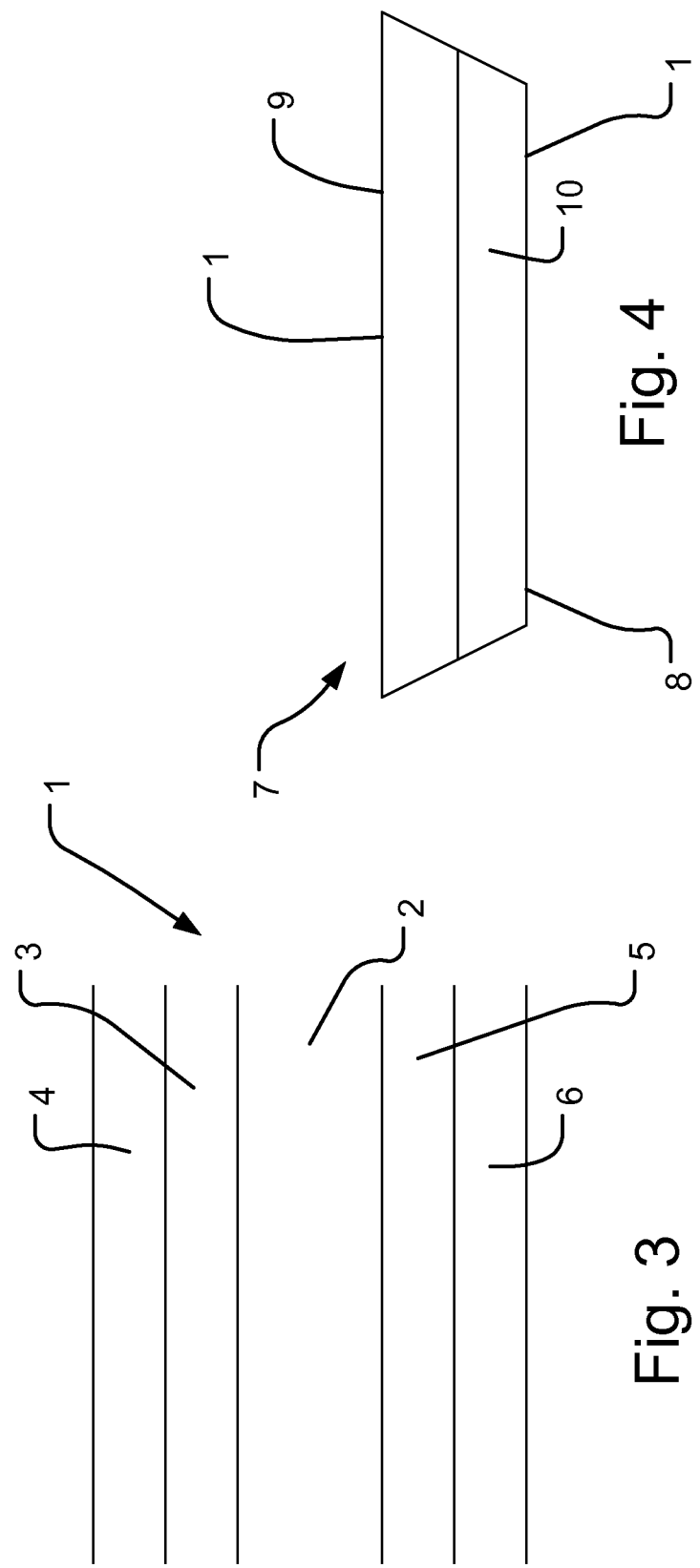

METHOD FOR MANUFACTURE OF AND A FOIL FOR ENCLOSING OR WRAPPING A PRODUCT TO BE HEATED IN AN OVEN

CROSS-REFERENCE TO RELATED APPLICATIONS

This application is a 371 national phase filing of International Application No. PCT/EP2017/076217, entitled "A METHOD FOR MANUFACTURE OF AND A FOIL FOR ENCLOSING OR WRAPPING A PRODUCT TO BE HEATED IN AN OVEN", filed 13 Oct. 2017, which claims priority to EP Patent Application No. 16194284.2, entitled "A METHOD FOR MANUFACTURE OF AND A FOIL FOR ENCLOSING OR WRAPPING A PRODUCT TO BE HEATED IN AN OVEN", filed 18 Oct. 2016.

BACKGROUND

Field of the Invention

The present disclosure relates to a method for manufacture of as well as a multi-layered foil for enclosing or wrapping a product to be heated in an oven.

Description of the Related Arts

Today, much food is produced both industrially and at home by heating a foodstuff object or product in an oven with the purpose of cooking the object. Such an object may e.g. be a potato which is to be baked in a conventional electric household oven. A conventional electric oven comprises an internal oven cavity with a coloured inner oven surface that faces the product to be heated. The internal oven surface is heated with electric energy and the heat energy is transmitted from the oven surface to the object to be heated via radiation and convection (and rarely via conduction which requires physical contact between oven surface and object) to the object so that the object is heated and thereby cooked. The distribution of heat energy released from the oven surface between radiation and convection is typically approximately even, but varies to some extend dependent on factors such as the oven surface material and temperature. Thus, significant amounts of heat energy are released usually via both radiant heat and convection. The oven surface is typically manufactured of or coated with dark or black enamel, which has a high emissivity and allows for heat to be quickly and efficiently released from the oven surface.

When heating an object in an oven there is often a desire to transfer the heat energy from the oven quickly and efficiently to the object. This accelerates cooking time and saves energy. Therefore, there is a desire to allow for heat energy released both via convection and radiation to be absorbed in the object as efficiently and quickly as possible.

The object to be heated, e.g. a potato to be baked, may today often be wrapped in aluminium foil. It may also, e.g. in case of a ready meal, a paté or the like, be positioned in an aluminium foil tray, potentially covered with an aluminium foil lid.

Since untreated aluminium foil has a shiny or glossy, reflective surface, much or most of the radiant heat will be reflected by the aluminium surface facing outwardly, i.e. away from the object to be heated. This means that heating and cooking of an object wrapped in aluminium foil is slower and more inefficient. This drawback related to the wrapping or positioning of foodstuff objects to be heated in an oven in aluminium foil is well-known and it has been suggested to apply a dark ink or colour, such as graphite or black Teflon, to one surface of the aluminium foil. As a person skilled in the art would realize, this will improve the foil's ability to absorb radiant heat in an oven. However, these attempts at resolving the issues of untreated aluminium foil have been largely unsuccessful on the market, which may be due to other drawbacks arising, including the foil appearing to or being conceived by consumers, especially private, domestic consumers, as being non-hygienic or dirty due to its dark colour or being a health risk for other reasons, e.g. colour rubbing off or giving off of smell during heating and cooking.

To overcome these issues, it has been attempted to provide the aluminium foil with a coating of a light or whitish colour in which the coating has improved abilities as to absorption of radiant heat, i.e. reflects less radiant heat back towards the oven surface. Specifically, such a coating may comprise a first, inner layer of carbon black and a second, outer layer of TiO2 (titanium dioxide). Since TiO2 has a light, white or whitish colour, the coated surface of the resultant coated aluminium foil has a more acceptable colour. The TiO2 layer allows for a significant portion of the radiant heat to pass through it and to reach the carbon black layer where a large portion of the radiant heat is absorbed. The carbon black layer will then conduct a large portion of the heat to the aluminium foil, which again will conduct a large portion of the heat to the foodstuff object to be heated since the object is in direct contact with the aluminium foil. Hereby the good radiant heat absorbing properties of carbon black are combined with the lighter coloured surface of TiO2.

However, a number of drawbacks are associated with this coated aluminium foil. The TiO2 and the carbon black both use an NC based binder system. When exposed to temperatures above about 210° C., the polymers of the NC binder system start to degrade, creating an undesirable paint-like smell. Also, the NC based binder system has a tendency to rub off, and heat, colour, product and scratch resistance of the coating is not satisfactory.

WO 2009/000272 A1 discloses a heat transmission system based on electromagnetic radiation, which heat transmission system comprises an oven cavity and a foil with at least two layers, wherein the at least two layers of the foil comprise a radiation-absorbing layer, wherein the wavelength spectre of the electromagnetic radiation of the radiation-absorbing layer and the wavelength spectre of the electromagnetic radiation of the oven cavity are attuned to each other.

SUMMARY

An object of the disclosure and/or of the present disclosure may be seen as to provide a foil and a method of manufacture thereof which avoids, solves or lessens one or more of the above mentioned drawbacks.

According to the disclosure, these and further objects may be met by a method for manufacture of a foil for enclosing or wrapping a product to be heated in an oven, comprising the steps of: providing an aluminium layer comprising aluminium, applying a first ink material at a surface of the aluminium layer to form a first ink layer, and applying a second ink material at a surface of the first ink layer to form a second ink layer, the first ink layer thereby being positioned between the aluminium layer and the second ink layer, the first ink layer being adapted for absorbing radiant energy, the second ink layer being adapted for allowing radiant energy to pass through it so as to reach the first ink layer, wherein a binder system of the first and/or second ink material is based on PVB (polyvinyl butyral).

Experiments have shown that hereby heat resistance of the manufactured foil may be ensured at high temperatures, potentially up to or above 200° C. or more or even up to above 300° C., the latter especially in the case where a hardener and/or cross-linker is combined with the PVB-based binder system, see further below.

Additionally, the giving off of smell from the foil during heating in connection with cooking of an object or a foodstuff product, specifically from the first and second ink layers, may be reduced or substantially avoided.

Product resistance and/or fastness or colour resistance of the ink colours may be significantly improved, especially against temperature and/or fat, i.e. against cold or warm products and/or fatty products such as oil, margarine or butter of a product to be cooked. The ink layer(s) of the manufactured foil thus "rubs off" or "sets off" to a significantly lesser extent or not at all.

Furthermore, scratch resistance of the foil, especially of the ink layers of the foil, may be significantly improved. Where a hardener or cross-linker is combined with the PVB-based binder system as described below, these advantages may be even further pronounced or increased.

Today, inks with PVB based binder systems are normally used for printing on a surface of a transparent film laminate facing another layer, i.e. not on an outer surface thereof, and it is rarely or never used for surface printing as according to the present disclosure.

In terms of the present disclosure, the term "radiant energy" may be defined as energy in the form of electromagnetic (EM) radiation, specifically radiant heat and/or EM radiation, specifically within the infrared (IR) spectrum, specifically within the spectrum 700-1,000,000 nm, more specifically 2,500-10,000 nm or 8,000-10,000 nm.

The first and/or second ink layer may have a wavelength spectrum of about 2,500-10,000 nm or about 8,000-10,000 nm. Hereby, it may be adapted to absorb radiant heat radiated from e.g. an inner oven surface, which may be of or comprise or be coated with enamel. For an oven of which an oven surface of an oven cavity comprises enamel, which is among the most frequently used material for coating oven cavities, the radiation emitted from the surface typically has a wave length spectrum within these ranges. Heating of a product to be cooked may thus occur more efficiently.

Generally, in this disclosure the word "oven" may be defined as including any cooker suitable for heating and cooking an object, including conventional ovens with an oven compartment as well as barbecues.

The aluminium layer may be in contact with the first ink layer. Additionally, or alternatively, the first ink layer may be in contact with the second ink layer.

The aluminium layer may be provided as an aluminium foil that may be rolled off of a roll. Alternatively, or additionally, the aluminium layer may substantially consist of aluminium.

The first ink layer may first be applied at the surface of the aluminium layer after which the second ink layer is applied at the surface of the first ink layer.

After application of the ink layers, the ink layers may be allowed to dry and/or harden, potentially for about 24-72 hours, potentially about 48 hours.

The first ink layer may be applied directly on or onto the aluminium layer. Alternatively, or additionally, the second ink layer may be applied directly on or onto the first ink layer.

In the context of the present disclosure, an "ink" and/or an "ink material" may be defined as a liquid or lacquer comprising a colouring agent and being applicable to an object surface to provide that object surface with a colour.

An effect denoted "internal reflection" may occur inside the foil manufactured according to the method. Internal reflection refers to a phenomenon which is comparable to the "greenhouse effect" and refers to radiant heat reflecting back and forth between layers inside the foil, specifically between the second ink layer and the aluminium layer. This may have the effect of improving the foil's, specifically the aluminium layer's, ability to absorb radiant heat in order to be able to transmit (by conduction, radiation and/or convention) the heat energy to an object wrapped or positioned in the foil. More specifically, the internal reflection of the foil may include that the first and second ink layers are adapted so that the second ink layer allows for a first portion of radiant energy radiating on the second ink layer from the outside and/or from or on an outer surface thereof (e.g. from an inner oven surface) to pass through the second ink layer to reach and be at least partly absorbed as heat energy in the first ink layer, the first ink layer conducting at least part of this heat energy to the aluminium layer. Additionally, the first ink layer may allow a second portion of the radiant energy to pass through the first ink layer to reach the aluminium layer, a portion of the second portion being absorbed as heat energy in the aluminium layer and a third portion being reflected by the aluminium layer. A portion of this third portion may again be absorbed as heat energy in the first ink layer, a portion of which again is conducted to the aluminium layer as heat energy, and a fourth portion of the radiant energy continuing to reach the second ink layer where a fifth portion is potentially reflected by the second ink layer. A portion of this fifth portion may then again be absorbed in the first ink layer, and a sixth portion of the radiant energy may continue to reach the aluminium layer, which again may absorb a portion and reflect a portion and the process may continue again as described above. Hereby, a relatively large portion of the radiant energy may be absorbed as heat energy in the foil, specifically in the aluminium layer thereof, whereby the aluminium foil may transfer this heat energy via conduction and/or radiation and/or convection to an object wrapped in or positioned within the foil. This significantly improves efficiency of a heat source such as an oven.

The first and/or second ink material may be diluted into ethyl acetate and/or propyl acetate and/or another type of acetate. This may ensure quick drying of the inks during manufacture, which may again avoid decomposition and/or mixture of the inks or the pigments/colouring agents of the inks during application of the first ink layer onto the second ink layer. Initial ink material(s) may be diluted in ethyl acetate, propyl acetate and/or other acetates, and further ethyl acetate, propyl acetate and/or other acetates may be added to adjust the kinematic viscosity (or flow time, see below) of the ink material(s). Generally, in this disclosure an "initial" ink material is to be understood as an ink material that forms the basis for the ink material used according to the method or in the foil according to the disclosure, this initial ink material potentially being treated by inclusion of a binder system and potentially other materials so as to form the ink material that is applied according to the disclosure. The first and second ink materials may be printing inks and/or lacquers pigmented with one or more pigments and/or colouring agents.

The first and/or second ink layer, respectively, may comprise or substantially consist of an ink.

The first ink material may comprise or essentially consist of or be pigmented or coloured with carbon black, potentially ripened carbon black and/or dark or black minerals. Alternatively, or additionally, the second ink material may comprise or essentially consist of or be pigmented or coloured with titanium dioxide, TiO2. Alternatively, or additionally, the second ink material may comprise or essentially consist of or be pigmented or coloured with titanium dioxide, CaSO4, MgCO3 and/or SiO2 and/or aluminium flakes.

The first ink layer may be coated and/or printed and/or lacquered, potentially onto the aluminium layer. The second ink layer may similarly be coated and/or printed and/or lacquered, potentially onto the first ink layer. The printing may be done by gravure printing and/or rotogravure printing and/or flexo printing and/or offset printing and/or any other suitable printing technology. Preferably, the application of the first and/or the second ink layer is able to deliver proper amounts of ink material and sufficient drying properties of the applied ink material to evaporate a solvent of the first and/or second ink material for diluting the ink material(s).

The first ink layer may be applied using gravure printing, potentially using a U5 raster gravure roller, and potentially applying 4-9, 5-8, 6-7 or 6.5 g/m2 wet weight of the first ink material. The gravure roller may be with 120-160, 130-150 or about 140, specifically 142, lines per cm and/or a channel width of 15-20, 16-19, 16-18 or 17μ and/or a cell depth of 20-40, 25-35 or about 30, specifically 31μ and/or a stylus (the angle in the bottom of the cell) of 100-160, 110-150, 120-140 or approximately 130 degrees. Alternatively, or additionally, the second ink layer may be applied using gravure printing, potentially using a U7 raster gravure roller, and potentially applying 2-8, 3-7, 4-6 or approximately 5 g/m2 wet weight of the second ink material. The gravure roller may be with 120-160, 130-150 or about 140, specifically 144, lines per cm and/or a channel width of 15-25, 17-23, 18-22, 19-21 or approximately 20 or 21, specifically about 20.8μ and/or a cell depth of 20-60, 30-50, 45-55 or about 40, specifically about 41μ and/or a stylus (the angle in the bottom of the cell) of 100-140, 110-130, or approximately 120 degrees.

In this disclosure the expression "adapted for" may generally be interpreted as meaning "able to".

The aluminium layer may be a base and/or substrate and/or carrier layer and may form the basis for the application of the further layers of the foil.

The ink materials disclosed in this disclosure may be provided in the manufactured foil with sufficient strength to allow for also thicker aluminium layers or foils to be coated or lacquered with the ink materials and then afterwards in a cold form process be shaped into a tray, e.g. for pies, pizzas or other hot cooking foodstuffs. For aluminium foil to be wrapped around an object or product for being cooked, normally a 12 to 15μ aluminium layer thickness may be used, but thicknesses in the range of 8 to 20μ can be used. Even an aluminium layer thickness down to 5μ is possible, whereas the thickness also can be increased to over 40μ. For tray materials it has been proven that aluminium layers or foils in a thickness range of 50 to 150μ can be used for producing trays for cooking purposes without damaging the ink layers and where the full effect of the first, radiant energy absorbing ink layer is maintained.

One, more or all of the ink materials and/or ink layers may be based on raw materials which comply with regulatory demands for materials in direct food contact, especially if exposed to high temperatures, such as temperatures up to 300° C. or above.

One or more further layers may be provided between the first and second ink layers and/or between the first ink layer and the aluminium layer and/or on a surface of the aluminium layer facing away from the first ink layer and/or on a surface of the second ink layer facing away from the first ink layer. Such layer(s) may include one or more further ink layers.

As an alternative to a binder system of the first and/or second ink material based on PVB (polyvinyl butyral), the ink layers comprising an NC based hardener described above could be improved by allowing the first and second ink layers to comprise binder systems with different base components, specifically one may be based on NC and the other may be based on polyester. This would require adding a different hardener and/or cross-linker to both colours, which (compared to the present disclosure where hardener may be added to only one of the ink layers and will migrate through the other since both layers comprise the PVB based binder system) would increase production cost and waste production since leftover ink with added hardener can usually not be re-used. Furthermore, when exposed to temperatures above about 210° C., the polymers of the binder systems would start to degrade as in the NC based binder system described above, creating an undesirable paint-like smell. Also, ink layers with these binder systems would tend to rub off, and heat, colour, product and scratch resistance of the coating would be inferior compared to the use of a PVB based binder system for both layers.

Also disclosed herein is a foil as described above in which the ink layers comprising a PVB based binder system are replaced by the first and second ink layers comprising respective binder systems with different base components, specifically one based on NC and the other may be based on polyester. All options and embodiments mentioned in this disclosure for the disclosure related to the ink layers comprising a PVB based binder system may also apply to the case where the PVB based binder system is replaced by binder systems with different base components.

In an embodiment of the method according to the disclosure the first and/or the second ink material comprise(s) an isocyanate-based hardener and/or cross-linker.

Hereby, heat resistance of the foil may be further ensured at high temperatures, potentially up to more than 300° C. Additionally, the giving off of smell from the foil during heating, specifically from the first and second ink layers, may be further reduced or substantially avoided. Product resistance and/or fastness or colour resistance of the ink materials and/or ink layers may be significantly improved, especially against temperature and/or fat, i.e. against cold or warm products and/or fatty products such as oil, margarine or butter of a product to be cooked which is wrapped in the foil. Furthermore, scratch resistance of the foil, especially of the ink layers of the foil, may be even further improved.

Especially in the case where both ink layers are based on a PVB based binder system, potentially the same binder system, the hardener or cross-linker may migrate from one of the ink layers to the other ink layer during manufacture to affect both ink layers, improving scratch, moisture, grease and/or heat resistance of the foil.

An initial ink material of the first and/or second ink layer may be provided first, after which the hardener or cross-linker is added to the initial ink material.

The hardener or cross-linker may be added before adjusting of the viscosity (or flow time) of one or both ink materials, see further below.

The amount of hardener and/or cross-linker applied to the ink material of the first and/or the second ink layer may be 5 to 15%, potentially 7 to 13, 8 to 12, 9 to 11 or about 10% wet weight, i.e. weight percentage of the ink material(s) in the wet condition, i.e. before being applied.

Flow time of the hardener or cross-linker measured according to ISO 2431:2011 before addition to the initial ink material(s) may be 30-60, 35-55, 40-50, 43-47, 44-46 or approximately 45 seconds measured with flow cup no 5.

Generally, as used herein the flow time measured in seconds is measured is according to ISO 2431:2011, entitled "Paints and varnishes—Determination flow time by use of flow cups", fifth edition, dated 2011 Nov. 15. The flow time measured in seconds (i.e. flow time through one of the flow cups according to the ISO standard) using this standard may, according to the standard, be converted to kinematic viscosity v with the SI unit mm2/s using the following formulae:

| Flow cup | Kinematic viscosity, v mm$^2$/s |
|---|---|
| No 3 | $v = 0.443 \times t - \dfrac{200}{t}$ |
| No 4 | $v = 1.37 \times t - \dfrac{200}{t}$ |
| No 5 | $v = 3.28 \times t - \dfrac{200}{t}$ |
| No 6 | $v = 6.90 \times t - \dfrac{570}{t}$ | where t is the flow time in seconds through the chosen cup number.

The hardener or cross-linker may be added to the initial ink material(s) during stirring. Hereby, coagulation may potentially be avoided.

The initial ink material including the added hardener or crosslinker mixed therein may be diluted in ethyl acetate, propyl acetate and/or other acetates as described to achieve the desired flow time/kinematic viscosity.

Other suitable hardeners and/or cross-linkers may alternatively be used.

In another embodiment the first ink layer and/or the second ink layer is/are applied with a respective dry grammage or areal density of 1.5-5.0 g/m2, and/or a respective thickness of the first and/or second ink layer in a dry condition thereof is less than 5.9µ.

It has been shown that such low thicknesses are achievable using the above described means including a PVB based binder system and/or dilution in ethyl acetate, propyl acetate and/or other acetates and/or the addition of a hardener or cross linker.

The first ink layer may be applied with a dry areal density or grammage of 1.7-3.0, 2.0-2.7 or 2.2-2.5 g/m2 (i.e. dry weight). Similarly, the second ink layer may alternatively or additionally be applied with an areal density or grammage of 2.0-5.0, optionally 2.5-4.0 or 2.5-2.7 g/m2 (dry weight). Alternatively, or additionally, a thickness of the first and/or second ink layer may be above 1, 1.5 or 1.7µ. Alternatively, or additionally, a thickness of the first and/or second ink layer may be less than 5, 4, 3, or 2µ. Alternatively, or additionally, a thickness of the first and/or second ink layer may be in the interval of 1.0-5.9µ, optionally 1.5-5.5, 1.7-5.5, 2.0-5.5, 1.5-5.0, 1.5-4.0, 1.5-3.5, 1.7-3.0, 1.7-2.5 or 1.7-2.2µ. Alternatively, or additionally, an accumulated thickness of the first and second ink layers may be less than 11.9µ, optionally less than 11.8, 11.5, 11, 10, 9, 8, 7, 6, 5 or 4µ. Alternatively, or additionally, an accumulated thickness of the first and second ink layers may be above 2, 3 or 3.5µ. Alternatively, or additionally, an accumulated thickness of the first and second ink layers may be in the interval of 2.0-11.9µ, optionally 3.0-11.0, 3.5-11.0, 4.0-11.0, 3.0-7.0, 3.5-6.0, 3.5-5.0 or 3.5-4.5µ. Thicknesses in this context are in a dry condition of the ink layers. Similarly, it has been shown that such low thicknesses are achievable using the above described means including a PVB based binder system and/or dilution in ethyl acetate, propyl acetate and/or other acetates and/or the addition of a hardener or cross linker.

In another embodiment the flow time measured according to ISO 2431:2011 of the first and/or second ink material before and/or during application thereof is 35-100 seconds measured with flow cup no. 3 and/or 30-45 seconds measured with flow cup no. 4, and/or the kinematic viscosity of the first and/or second ink material before and/or during application thereof is 10-55 mm2/s.

Hereby, surprisingly small ink layer thicknesses may be arrived at, including the thicknesses and grammages as described above.

The low flow time/kinematic viscosity may be achieved by diluting the initial first and/or second ink materials in ethyl acetate, propyl acetate and/or other acetates as described above.

The flow time measured according to ISO 2431:2011 of the first and/or second ink material before and/or during application thereof may be between 50 seconds measured with flow cup no. 3 and 35 seconds measured with flow cup no 4 and/or between 60-100, 70-90, 75-85 or about 80 seconds measured with flow cup no. 3.

The flow time measured according to ISO 2431:2011 of the initial first ink material (i.e. an initial ink material which is treated to form the first ink material) may be 55-90, 60-85, 65-80, 70-75 or approximately 72 seconds measured with flow cup no 4. Comparatively, the flow time measured according to ISO 2431:2011 of the initial second ink material (i.e. an initial ink material which is treated to form the second ink material) may be 35-55, 38-52, 40-50, 42-48, 43-47, 44-46 or approximately 45 seconds measured with flow cup no 5.

In another embodiment the first and/or second ink material is diluted into ethyl acetate and/or propyl acetate and/or another acetate.

In another embodiment the first ink material comprises or essentially consists of or is pigmented or coloured with carbon black.

The carbon black may be ripened carbon black.

In another embodiment the second ink layer comprises or essentially consists of or is pigmented or coloured with titanium dioxide.

In another aspect the present disclosure relates to a foil for enclosing or wrapping a product to be heated in an oven, comprising an aluminium layer comprising aluminium, a first ink layer positioned between the aluminium layer and a second ink layer, the first ink layer being adapted for absorbing radiant energy, the second ink layer being adapted for allowing radiant energy to pass through it, wherein a binder system of an ink material of the first ink layer and/or of the second ink layer is based on PVB (polyvinyl butyral).

This foil according to the present disclosure may be manufactured according to the method according to the disclosure and may comprise any of the features described above in connection with the method.

The skilled person will appreciate that advantages and effects of the foil according to the disclosure are identical to, similar to and/or comparable to those described above in connection with the method according to the disclosure.

In an embodiment of the foil according to the disclosure the first and/or the second ink material comprise(s) an isocyanate-based hardener and/or cross-linker.

In another embodiment the first ink material comprises or is pigmented or coloured with carbon black.

The carbon black may be ripened carbon black.

In another embodiment the second ink layer comprises or is pigmented or coloured with titanium dioxide.

In another aspect the present disclosure relates to a method for manufacture of a foil for enclosing or wrapping a product to be heated in an oven, comprising the steps of: providing an aluminium layer comprising aluminium, applying a first ink material at a surface of the aluminium layer to form a first ink layer, and applying a second ink material at a surface of the first ink layer to form a second ink layer, the first ink layer thereby being positioned between the aluminium layer and the second ink layer, applying a third ink material at an opposite surface of the aluminium layer to form a third ink layer, the opposite surface being opposite to the surface of the aluminium layer at which the first ink layer is applied, and applying a fourth ink material at a surface of the third ink layer to form a fourth ink layer, the third ink layer thereby being positioned between the aluminium layer and the fourth ink layer, the first and third ink layers being adapted for absorbing radiant energy, the second and fourth ink layers being adapted for allowing radiant energy to pass through them so as to reach the first and third ink layers, respectively.

Experiments have shown that the foil manufactured according to this method according to the present disclosure is not only suitable for absorbing radiant heat and transferring it to the aluminium layer and again transmit the energy to an object wrapped in the foil via heat conduction (as described above); rather, the provision of the third and fourth ink layers allows for heat energy to be efficiently transmitted to the object also via radiation and/or convection, especially in the case of a third ink layer which has a high emissivity (e.g. is black and/or comprises carbon black). Therefore, the foil need not be in contact with the object to be heated, but may be provided at a distance. This allows for using the foil for example as a lid of a tray with the object or product to be heated therein and/or be used as the tray material where there is a distance between the object and the foil at least in some areas.

The method according to this aspect of the disclosure may be combined with the above described method according to the disclosure wherein a binder system of the first and/or second and/or third and/or fourth ink material is based on PVB (polyvinyl butyral). Hereby advantages similar to those described above in view of the method according to the first aspect of the disclosure may be achieved. The third ink layer may be substantially identical to the first layer, and/or the fourth ink layer may be substantially identical to the second ink layer. Generally, the options mentioned above for the first and second ink layers also apply to the third and fourth ink layers, respectively.

As an alternative, the surface of the aluminium layer facing away from the first ink layer may only comprise the third ink layer, i.e. not necessarily a fourth ink layer.

In yet another aspect the present disclosure relates to a foil for enclosing or wrapping a product to be heated in an oven, comprising: an aluminium layer comprising aluminium, a first ink layer positioned between the aluminium layer and a second ink layer, the first ink layer being adapted for absorbing radiant energy, the second ink layer being adapted for allowing radiant energy to pass through it, a third ink layer positioned between the aluminium layer and a fourth ink layer, the third ink layer being positioned oppositely from the first ink layer with respect to the aluminium layer, the third ink layer being adapted for absorbing radiant energy, the fourth ink layer being adapted for allowing radiant energy to pass through it.

The skilled person will appreciate that advantages and effects of the foil according to this aspect of the disclosure are identical to, similar to and/or comparable to those described immediately above in connection with the lastly described method according to the disclosure.

In yet another aspect the disclosure relates to a foil obtainable by any of the methods according to the disclosure as described above.

In yet another aspect the disclosure relates to a method for heating an object, comprising the steps of: providing an oven transmitting radiant energy, providing a foil manufactured according to the method of any one of the above described methods according to the disclosure or a foil according to any one of the above described embodiments according to the disclosure, at least partly enclosing the object to be heated with the foil, and positioning of the object within the oven.

The second ink layer may allow a first portion of radiant energy transmitted from the oven to pass through the second ink layer to reach and be at least partly absorbed as heat energy in the first ink layer, the first ink layer may conduct at least part of the heat energy to the aluminium layer, and the aluminium layer may transmit at least part of the heat energy to the object.

The oven may comprise an internal enamel coating which in use transmits heat energy in the form of radiant heat and convection to an oven spacing in which the object is positioned.

In yet another aspect, the disclosure relates to a packaging for enclosing a product to be heated in an oven, comprising a tray and a lid, both manufactured of a foil manufactured according to any of the above methods or a foil according to any of the above embodiments according to the disclosure.

A person skilled in the art will appreciate that any and all of the above embodiments, options and developments may be combined with each other in accordance with the present disclosure.

BRIEF DESCRIPTION OF THE DRAWINGS

In the enclosed schematic drawings, which show non-binding examples of embodiments of the present disclosure, FIG. 3 is an view similar to that of FIG. 1 of a second embodiment of a foil according to the present disclosure, and FIG. 4 is a cross sectional view of an embodiment of a packaging according to the disclosure comprising the foil illustrated in FIG. 3.

DETAILED DESCRIPTION

Figure 1:
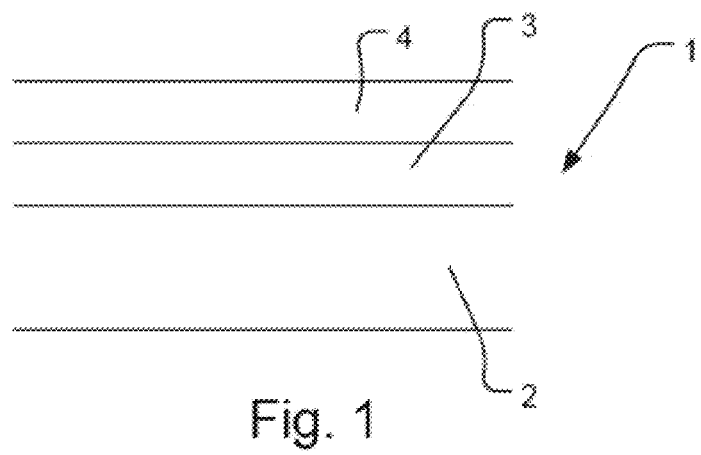
FIG. 1 is an enlarged side view or cross sectional view of a first embodiment of a foil according to the present disclosure.
Figure 2:
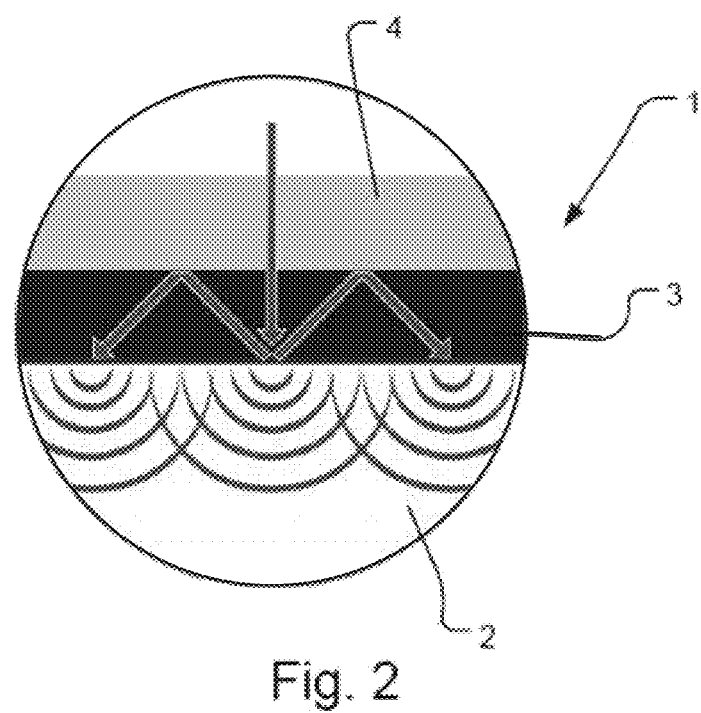
FIG. 2 is a view similar to that of FIG. 1 illustrating movement of heat energy within the foil.

FIGS. 1 and 2 show a first embodiment of a foil according to the present disclosure, the foil 1 being suitable for enclosing or wrapping a product to be heated in an oven.

The foil 1 has been manufactured by an embodiment of the method according to the disclosure comprising the steps of: providing an aluminium layer 2 comprising aluminium, applying a first ink material at a surface of the aluminium layer 2 to form a first ink layer 3, and applying a second ink material at a surface of the first ink layer 3 to form a second ink layer 4, the first ink layer 3 thereby being positioned between the aluminium layer 2 and the second ink layer 4, the first ink layer 3 being adapted for absorbing radiant energy, the second ink layer 4 being adapted for allowing radiant energy to pass through it so as to reach the first ink layer, wherein a binder system of the first and/or second ink material is based on PVB (polyvinyl butyral).

The aluminium layer 2 is in contact with the first ink layer 3, and the first ink layer 3 is in contact with the second ink layer 4.

In the method of manufacture of the foil 1 the aluminium layer 2 is first provided as an aluminium foil that is rolled off of a roll. The aluminium layer substantially consists of aluminium. The first ink layer 3 is then applied on the surface of the aluminium layer 2 after which the second ink layer 4 is applied on the surface of the first ink layer 3.

After application of the ink layers 3, 4, the ink layers 3, 4 are allowed to dry and/or harden for about 48 hours.

FIG. 2 illustrates an "internal reflection" effect that occurs or may occur inside the foil 1. It is noted that this explanation is a theory and the applicant does not intend to be bound by this theory. The straight arrow in FIG. 2 illustrates a first portion of radiant heat radiating on the second ink layer 4 from an outside on an outer surface thereof from an inner oven surface. As shown, this first portion passes through the second ink layer 4, another portion being reflected on and yet another portion being absorbed in the second layer 4. As also shown, this first portion reaches and is at least partly absorbed as heat energy in the first ink layer 3, the first ink layer conducting at least part of this heat energy to the aluminium layer 2 (not illustrated). Additionally, the first ink layer 3 allows a second portion of the radiant energy to pass through the first ink layer 3 so as to reach the aluminium layer 3. A (relatively small) portion of this second portion is absorbed as heat energy in the aluminium layer, and a third portion is reflected by the aluminium layer 2, the latter being shown as the first half of the bent arrows in FIG. 2. A portion of this third portion may again be absorbed as heat energy in the first ink layer 3, a portion of which again being conducted to the aluminium layer 2 as heat energy. A fourth portion of the radiant energy continues through the first ink layer 3 to reach an inner surface of the second ink layer 4 where a fifth portion is reflected by the second ink layer 4, this being illustrated by the second half of the bent arrows. A portion of this fifth portion is then again absorbed in the first ink layer 3, and a sixth portion of the radiant heat continues to reach the aluminium layer 2, which again may absorb a portion and reflect a portion, and the process may continue again as described above. From the first ink layer 3 the heat energy absorbed in the first ink layer 3 is conducted to the aluminium layer 2, this conduction being illustrated by the waves in the aluminium layer 2 in FIG. 2. Hereby, a comparably large portion of the radiant energy radiating on the second ink layer 4 is absorbed as heat energy in the foil 1, specifically in the aluminium layer 2 thereof, and the aluminium layer 2 may transfer this heat energy via conduction and/or radiation and/or convection to an object wrapped in or positioned within the foil 1. The object to be heated will be positioned at a surface of the aluminium layer 2 facing oppositely from the surface on which the first ink layer 3 is applied.

The first and second ink materials are diluted into ethyl acetate.

The first ink material is pigmented with ripened carbon black. The second ink material is pigmented with titanium dioxide, $TiO_2$.

The first ink layer 3 is printed on the aluminium layer 2. The second ink layer 4 is subsequently printed on the first ink layer 3. The printing is done by rotogravure printing. The first ink layer 3 is applied using a U5 raster gravure roller, applying about 6.5 g/m2 wet weight of the first ink material on the aluminium layer 2. The gravure roller is 142 lines per cm, a channel width of 17μ, a cell depth of 31μ and a stylus (the angle in the bottom of the cell) of approximately 130 degrees. The second ink layer is applied using a U7 raster gravure roller, applying approximately 5 g/m2 wet weight of the second ink material on the first ink layer 3. The gravure roller is with 144 lines per cm, a channel width of about 20.8μ, a cell depth of 20 about 41μ and a stylus (the angle in the bottom of the cell) of approximately 120 degrees. The aluminium layer thickness is about 13μ.

The aluminium layer 2 is a base or substrate or carrier layer that forms the basis for the application of the ink layers 3 and 4.

In other embodiments one or more further layers may be provided between the first and second ink layers 3, 4 and/or between the first ink layer 3 and the aluminium layer 2 and/or on a surface of the aluminium layer 3 facing away from the first ink layer 3 and/or on a surface of the second ink layer 4 facing away from the first ink layer 3. Such layers may include one or more further ink layers.

The first and second ink materials comprise an isocyanate-based hardener or cross-linker. The hardener or cross-linker may migrate during manufacture to affect both ink layers 3, 4. The amount of hardener applied to the initial ink materials is about 10% wet weight, i.e. weight percentage of the ink material(s) in the wet condition, i.e. before being applied.

Flow time of the hardener before addition to the initial ink materials measured according to ISO 2431:2011 is approximately 45 seconds measured with flow cup no 5.

The first ink layer 3 is applied with an areal density or grammage of about 2.3 g/m2 (dry weight). Similarly, the second ink layer 4 is applied with an areal density or grammage of about 2.6 g/m2 (dry weight). A thickness of each of the first and second ink layers 3, 4 is about 2.2μ, an accumulated thickness of the first and second ink layers 3, 4 being about 4.4μ. Thicknesses in this context are measured in a dry condition of the ink layers 3, 4.

The flow time measured according to ISO 2431:2011 of the first and second ink materials before and during application thereof is approximately 80 seconds measured with flow cup no. 3.

The resultant foil 1 shown in FIGS. 1 and 2 comprises the aluminium layer 2, the first ink layer 3 positioned between the aluminium layer 2 and the second ink layer 4.

The foil 1 of FIGS. 1 and 2 may be used in an embodiment of the method according to the disclosure for heating an object. This method comprises the steps of: providing an oven (not shown) transmitting radiant energy, providing the foil 1, positioning an object to be heated (not shown), such as a potato to be baked, within the foil 1, and positioning of the object within the oven.

The oven comprises an internal enamel coating which in use transmits heat energy in the form of radiant heat and convection to an oven spacing in which the object is positioned.

The oven is heated and the "internal reflection" effect explained above with reference to FIG. 2 may occur within the foil 1.

In FIGS. 3 and 4 elements of the drawings which are identical to or have the same function as elements in FIGS. 1 and 2 are provided with identical reference numbers.

FIG. 3 shows a second embodiment of the foil according to the disclosure. This foil 1 is identical to and is manufactured in an identical manner as the foil 1 shown in FIGS. 1 and 2 except for the differences explained in the following.

Thus, according to the disclosure the foil 1 of FIG. 3 is manufactured by the method explained above with reference to FIGS. 1 and 2. The method comprises the further steps of: applying a third ink material on an opposite surface of the aluminium layer to form a third ink layer 5, the opposite surface being opposite to the surface of the aluminium layer 2 on which the first ink layer 3 is applied, and applying a fourth ink material on a surface of the third ink layer 5 to form a fourth ink layer 6, the third ink layer 5 thereby being positioned between the aluminium layer 2 and the fourth ink layer 6, the first 3 and third 5 ink layers being adapted for absorbing radiant energy, the second 4 and fourth 6 ink layers being adapted for allowing radiant energy to pass through them so as to reach the first 3 and third 5 ink layers, respectively.

The third ink layer 5 is identical to the first layer 3, and the fourth ink layer 6 is identical to the second ink layer 3.

Accordingly, the resultant foil 1 of FIG. 3 comprises the aluminium layer 2, the first ink layer 3 positioned between the aluminium layer 2 and the second ink layer 4, the first ink layer 3 being adapted for absorbing radiant energy, the second ink layer 4 being adapted for allowing radiant energy to pass through it. Furthermore, the third ink layer 5 is positioned between the aluminium layer 2 and the fourth ink layer 6, the third ink layer 5 being positioned oppositely from the first ink layer 3 with respect to the aluminium layer 2, the third ink layer 5 being adapted for absorbing radiant energy, the fourth ink layer 6 being adapted for allowing radiant energy to pass through it.

The foil 1 shown in FIG. 3 is not only suitable for absorbing heat energy in the aluminium layer 2 and transmit the energy to an object (not shown) wrapped in the foil 1 via heat conduction; the provision of the additional third 5 and fourth 6 ink layers allows for heat energy to be efficiently transmitted to the object also via radiation and/or convection, especially since the third ink layer 5 has a high emissivity and radiant heat may to some extent pass through the fourth ink layer. Therefore, the foil 1 need not be in contact with the object, but may be provided at a distance. This allows for using the foil 1 as a lid of a tray with the object or product to be heated therein and to be used as the tray material where there is a distance between the object and the foil 1 at least in some areas.

Accordingly, FIG. 4 shows an embodiment of the packaging according to the disclosure in the form of a lidded food tray 7. The food tray 7 comprises a tray 8 and a lid 9 for enclosing an object 10 to be heated in an oven (not shown). The object may be a ready meal, a TV dinner or the like. Both the tray 8 and the lid 9 are cut from a sheet of the foil 1 of FIG. 3. Since the foil 1 of FIG. 3 is symmetrical about a centre plane of the aluminium layer 3, it does not matter how the foil 1 is positioned.

The tray 8 has in a conventional manner in a cold form process been shaped into a tray shape. The aluminium layer 2 of the tray foil 1 may advantageously have been modified to have a thickness of about 100μ so as to provide greater stiffness.

As can be seen in FIG. 4 there is a distance between the object 10 and the lid 9. As mentioned, oven heat absorbed in the lid 9 may efficiently be transferred to the object 10 via convection and radiation from the lid 9.

What is claimed is:

1. A method of manufacturing a foil for enclosing or wrapping a product configured to be heated in an oven, comprising:
    providing an aluminium layer;
    applying a first ink material at a surface of the aluminium layer to form a first ink layer;
    applying a second ink material at a surface of the first ink layer to form a second ink layer, the first ink layer being positioned between the aluminium layer and the second ink layer, wherein the first ink layer is configured to absorb radiant energy, and the second ink layer is configured to allow the radiant energy to pass through to the first ink layer, wherein the second ink layer is an outermost ink layer of the foil, and wherein a binder system of the first ink material and the second ink material is based at least in part on polyvinyl butyral (PVB); and
    applying a hardener to the second ink layer, wherein the hardener migrates from the second ink layer to the first ink layer based at least in part on the first ink layer including PVB.

2. The method according to claim 1, wherein the first ink layer or the second ink layer is applied with a respective dry areal density or grammage of 1.5-5 grams per square meter (g/m$^2$), or a respective dry thickness of the first or the second ink layer is less than 5.9 microns (μ).

3. The method according to claim 1, wherein flow time, measured according to International Organization for Standardization (ISO) 2431:2011, of the first or the second ink material before or during application is 35-100 seconds (s) measured with flow cup no. 3 or 30-45 (s) measured with flow cup no. 4, or the kinematic viscosity of the first or the second ink material before or during application is 10-55 square millimeter per second (mm$^2$/s).

4. The method according to claim 1, wherein the first ink material or the second ink material is diluted with ethyl acetate or propyl acetate or another acetate.

5. The method according to claim 1, wherein the first ink material comprises carbon black.

6. The method according to claim 1, wherein the second ink layer comprises titanium dioxide.

7. The method of claim 1, further comprising:
    providing the oven configured to transmit radiant energy,
    at least partly enclosing an object with the foil, and
    positioning the object within the oven.

8. The method of claim 1, further comprising:
    applying a third ink material at an opposite surface of the aluminium layer to form a third ink layer, wherein the opposite surface of the aluminium layer is opposite the surface of the aluminium layer where the first ink layer is applied; and
    applying a fourth ink material at a surface of the third ink layer to form a fourth ink layer, the third ink layer positioned between the aluminium layer and the fourth ink layer, wherein the first ink layer and the third ink layer are configured to absorb radiant energy, and the second ink layer and the fourth ink layer are configured to allow the radiant energy to pass through them.

* * * * *